US008022120B2

(12) United States Patent
Becker et al.

(10) Patent No.: US 8,022,120 B2
(45) Date of Patent: Sep. 20, 2011

(54) COMB POLYMERS AND THEIR USE AS ADDITIVES FOR PREPARATIONS OF MINERAL BINDERS

(75) Inventors: Stefan Becker, Mannheim (DE); Markus Klumpe, Mannheim (DE); Joachim Pakusch, Speyer (DE); Thomas Goetz, Leimersheim (DE); Christian Knoll, Neuhofen (DE); Rolf Gulden, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 367 days.

(21) Appl. No.: 12/092,586

(22) PCT Filed: Nov. 6, 2006

(86) PCT No.: PCT/EP2006/068143
§ 371 (c)(1),
(2), (4) Date: May 5, 2008

(87) PCT Pub. No.: WO2007/051858
PCT Pub. Date: May 10, 2007

(65) Prior Publication Data
US 2008/0300343 A1 Dec. 4, 2008

(30) Foreign Application Priority Data

Nov. 7, 2005 (DE) .......................... 10 2005 053 019

(51) Int. Cl.
*C04B 24/26* (2006.01)
*C08G 63/60* (2006.01)
*C08G 69/26* (2006.01)
*C08G 63/06* (2006.01)

(52) U.S. Cl. ............ 524/5; 524/606; 524/599; 528/332; 528/361

(58) Field of Classification Search .............. 524/5, 606, 524/599; 528/332, 361
See application file for complete search history.

(56) References Cited

U.S. PATENT DOCUMENTS

| 3,651,029 | A | * | 3/1972 | Fujimoto et al. ............... 526/260 |
| 5,728,207 | A | | 3/1998 | Arfaei et al. |
| 5,840,114 | A | | 11/1998 | Jeknavorian et al. |
| 6,384,111 | B1 | | 5/2002 | Kistenmacher et al. |

FOREIGN PATENT DOCUMENTS

| EP | 0 331 308 | | 9/1989 |
| EP | 560 602 | | 9/1993 |
| EP | 0 704 504 | | 4/1996 |
| EP | 0 704 504 A2 | * | 4/1996 |
| EP | 0 725 044 | | 8/1996 |
| EP | 0 753 488 | | 1/1997 |
| EP | 0 799 807 | | 10/1997 |
| EP | 1 136 507 | | 9/2001 |
| WO | 88 06585 | | 9/1988 |
| WO | WO 88/06585 | * | 9/1988 |
| WO | 98 28353 | | 7/1998 |
| WO | 01 74736 | | 10/2001 |
| WO | 2004 092092 | | 10/2004 |

OTHER PUBLICATIONS

U.S. Appl. No. 11/574,587, filed Mar. 2, 2007, Becker, et al.
U.S. Appl. No. 12/516,628, filed May 28, 2009, Uribe, et al.

* cited by examiner

*Primary Examiner* — William K Cheung
(74) *Attorney, Agent, or Firm* — Oblon, Spivak, McClelland, Maier & Neustadt, L.L.P.

(57) ABSTRACT

The present invention relates to novel comb polymers which bear poly-$C_2$-$C_4$-alkylene ether side chains A and functional groups B which at a pH of >12 are present in the form of anionic groups on a carbon backbone and also the salts of such comb polymers. The invention also relates to the use of these comb polymers as additives in preparations comprising a mineral binder. The polyalkylene ether side chains A have the following formula:

$$*\!-\!U\!-\!(C(O))_k\!-\!X\!-\!(Alk\text{-}O)_n\!-\!Y\!-\!Z \qquad A.$$

18 Claims, No Drawings

COMB POLYMERS AND THEIR USE AS ADDITIVES FOR PREPARATIONS OF MINERAL BINDERS

DESCRIPTION

The present invention relates to novel comb polymers which bear poly-$C_2$-$C_4$-alkylene ether side chains A and functional groups B which at a pH of >12 are present in the form of anionic groups on a carbon backbone and also the salts of such comb polymers. The invention also relates to the use of these comb polymers as additives in preparations of mineral binders.

Comb polymers having a carbon backbone which bears poly-$C_2$-$C_4$-alkylene ether side chains and anionic groups, in particular carboxylate groups, are used as additives for mineral binders and binder-comprising building materials, in particular for cement and cement-comprising building materials such as mortar, cement-bound plasters and renders and in particular for concrete, but also for gypsum and gypsum-based binder-comprising building materials such as modeling plaster, stucco plaster or troweling plaster, molding plaster, gypsum screed, etc.

It is assumed that the comb polymers disperse the particles of the mineral binder in the ready-to-use preparation of the binder, i.e. a preparation made up with water, and that the dispersing action of the comb polymers fluidizes the ready-to-use preparations. Thus, less water, based on the mineral binder, is required for setting a particular processing viscosity of the ready-to-use preparation on making up with water than in the case of a nonadditized preparation, which results in increased final strength of the additized preparation in the set state. Conversely, additized preparations have a lower viscosity than nonadditized preparations for the same amount of water, based on the mineral binder, which is desirable for many applications such as casting concrete or screed.

EP-A 331 308 describes comb polymers for dispersing cement which comprise a monoethylenically unsaturated carboxylic acid, a monoethylenically unsaturated sulfonic acid and an ester of a poly-$C_2$-$C_3$-alkylene glycol mono-$C_1$-$C_3$-alkyl ether in copolymerized form.

EP-A 560 602 again describes the use of comb polymers comprising an alkenyl ether of a poly-$C_2$-$C_{18}$-alkylene glycol mono-$C_1$-$C_4$-alkyl ether and maleic acid or maleic anhydride in copolymerized form as additives for concrete.

EP-A 753 488 again discloses the use of comb polymers which comprise monoethylenically unsaturated carboxylic acids and esters of monoethylenically unsaturated carboxylic acids of polyoxy-$C_2$-$C_4$-alkylene mono-$C_1$-$C_4$-alkyl ethers in copolymerized form and have a particular molecular weight distribution as dispersants for cement. Similar polymers for this purpose are described in EP-A 792 850.

EP-A 725 044 again describes the use of comb polymers of monoethylenically unsaturated monocarboxylic acids and esters of monoethylenically unsaturated carboxylic acids with polyoxyethylene mono-$C_1$-$C_5$-alkyl ethers in hydraulically setting compositions based on a mixture of cement and anhydrous calcium sulfate.

EP-A 799 807 again describes the use of comb polymers based on monoethylenically unsaturated monocarboxylic acids and alkylpolyalkylene glycol mono(meth)acrylates, with the latter being obtainable by a transesterification process, as dispersants for cement.

U.S. Pat. Nos. 5,728,207 and 5,840,114 describe the use of comb polymers which have been obtained by polymer modification of polymers having cyclic anhydride groups by means of alkylpolyalkylene ether amines as additives for cement-comprising preparations.

WO 98/28353 discloses comb polymers having a carbon backbone bearing alkylpolyalkylene ether groups and carboxylate groups. The comb polymers can be prepared both by modification of polymers comprising carboxylate groups with polyalkylene ethers and by copolymerization of suitable monomers comprising alkylpolyalkylene ether groups with ethylenically unsaturated carboxylic acids.

WO 01/74736 again describes comb polymers of poly-$C_2$-$C_4$-alkylene glycol (meth)acrylates with (meth)acrylic acid, with the poly-$C_2$-$C_4$-alkylene glycol (meth)acrylates being prepared by reaction of alkylpolyalkylene glycols with (meth)acrylic anhydrides in the presence of amines.

The earlier patent application PCT/EP009466 describes comb polymers similar to those of WO 01/74736, with the poly-$C_2$-$C_4$-alkylene glycol (meth)acrylates used for preparing the polymers being obtainable by reaction of alkylpolyalkylene glycols with (meth)acrylic anhydrides in the presence of a base which is insoluble in the reaction medium.

U.S. Pat. No. 3,651,029 describes the use of oil-soluble comb polymers having polyalkylene ether side chains which bear a morpholin-4-yl radical at their ends as additives for lubricants.

EP-A 704 504 describes homopolymers and copolymers of esters of ethylenically unsaturated carboxylic acids with polyalkylene etherols, which bear a nitrogen heterocycle at one end. The polymers described there are used as temperature-dependent thickeners in ink-jet inks.

The dispersing action of the comb polymers of the prior art is frequently insufficient, so that their fluidizing action in preparations based on mineral binders such as gypsum or cement is not satisfactory. In addition, studies carried out by the inventors of the present patent application have shown that the comb polymers prepared as described in the prior art frequently still comprise relatively large amounts of unreacted polyalkylene glycol monomethyl ethers which themselves have no fluidizing action, so that larger amounts of comb polymer are required to achieve the desired effect, which represents, firstly, an additional cost factor and, secondly, is likewise undesirable due to increased foam formation which results.

It is therefore an object of the present invention to provide additives for preparations based on mineral binders, which additives display a good fluidizing action in such preparations. In addition, the additives should be able to be prepared in such a way that they comprise only small amounts, if any, of by-products.

It has surprisingly been found that this object is achieved by comb polymers which have a carbon backbone and bear polyether groups of the formula A defined below and functional groups B which at a pH of >12 are present in the form of anionic groups on the polymer backbone.

The present invention accordingly provides for the use of comb polymers having a carbon backbone which bears polyether groups of the formula A

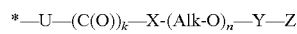  A where
* indicates the point of bonding to the carbon backbone of the comb polymer,
U is a chemical bond or an alkylene group having from 1 to 8 carbon atoms,
X is oxygen or an NR group,
k is 0 or 1,
n is an integer whose average value, based on the comb polymer, is in the range from 5 to 300, Alk is $C_2$-$C_4$-alkylene, with the Alk radicals within the group (Alk-O)$_n$ being able to be identical or different, Y is a linear or branched alkylene group which has from 2 to 8 carbon atoms and may bear a phenyl ring, Z is a 5- to 10-membered nitrogen heterocycle which is bound via nitrogen and can have, in addition to the nitrogen atom and carbon atoms, 1, 2 or 3 additional heteroatoms selected from among oxygen, nitrogen and sulfur as ring members, with the nitrogen ring members being able to bear a group R' and 1 or 2 carbon ring members being able to be present as carbonyl groups, R is hydrogen, $C_1$-$C_4$-alkyl or benzyl and R' is hydrogen, $C_1$-$C_4$-alkyl or benzyl;

and functional groups B which at a pH of >12 are present in the form of anionic groups, and salts thereof as additives in preparations which comprise a mineral binder. The invention also provides preparations of mineral binders which comprise such a comb polymer, in particular ready-to-use preparations and the articles produced therefrom.

Such comb polymers are new when the average value of n, based on the comb polymer, is in the range from 11 to 300 and on average 90 mol % of the Alk-O units in the group (Alk-O)$_n$ are $CH_2$—$CH_2$—O.

The present invention therefore also provides comb polymers having a carbon backbone which bears polyether groups of the general formula A and functional groups B which at a pH of >12 are present in the form of anionic groups, where the variables *, U, X, k, Alk, Y, Z, R and R' in the formula A have the abovementioned meanings and n is an integer whose average value, based on the comb polymer, is in the range from 11 to 300 and on average at least 90 mol % of the Alk-O units in the group (Alk-O)$_n$ are $CH_2$—$CH_2$—O.

According to the invention, the comb polymers are used for additization of preparations comprising mineral binders. The comb polymers employed according to the invention make it possible to achieve, in a particularly effective way, fluidization of the preparations, i.e. the amount of make-up water, based on the mineral binder, required to set the desired processing viscosity can be reduced compared to nonadditized preparations or compared to additized preparations of mineral binders in which the additives have a low fluidizing action or, alternatively, the amount of comb polymer required to set a particular viscosity of the preparation is lower than in the case of the comb polymers of the prior art.

For the purposes of the present invention, mineral binders are inorganic, generally mineral substances which when made up with water harden to produce a solid. A distinction is made here between substances which harden in air (nonhydraulic binders or air binders), e.g. gypsum, Sorel cement, magnesia binders and white lime, and hydraulic binders such as lime and in particular cement, including latently hydraulic binders such as blast furnace slags. The term "gypsum" used here comprises both anhydrite and calcium sulfate hemihydrate.

The comb polymers of the invention are particularly useful for the additization of preparations of hydraulic binders and very particularly suitable for the additization of cement-comprising preparations, but are also suitable for the additization of preparations of latently hydraulic binders.

Furthermore, the comb polymers of the invention are suitable for additization of preparations of nonhydraulic binders, in particular for the additization of gypsum and gypsum-comprising preparations such as modeling plaster, stucco plaster or troweling plaster, molding plaster, gypsum screed.

The comb polymers of the invention are also particularly useful for the additization of preparations comprising a mixture of a hydraulic binder and a nonhydraulic binder, e.g. a mixture of gypsum and cement, as mineral binder.

The comb polymers can be used both for the additization of preparations which consist essentially of the mineral binder and also, in particular, for the additization of binder-comprising building materials, i.e. preparations which comprise, as main constituent, aggregates which are bound by the mineral binder, for example for the additization of concrete and mortar.

The preparations of the mineral binder which have been additized according to the invention can be storage forms of the mineral binder, storage forms of the binder-comprising building material or ready-to-use preparations, i.e. preparations which, unlike the storage forms, already comprise the amount of water (make-up water) required for setting of the binder or building material.

Here and in the following, $C_2$-$C_4$-alkylene is a linear or branched alkanediyl group having from 2 to 4 carbon atoms, in particular a 1,2-ethanediyl group which may bear one or two methyl groups or an ethyl group, i.e. 1,2-ethanediyl, 1,2-propanediyl, 1,2-butanediyl, 1,1-dimethylethane-1,2-diyl or 1,2-dimethylethane-1,2-diyl.

$C_1$-$C_8$-Alkylene is a linear or branched alkanediyl group having from 1 to 8 and in particular from 1 to 4 carbon atoms, e.g. $CH_2$, 1,1-ethanediyl, 1,2-ethanediyl, 1,1-propanediyl, 1,3-propanediyl, 2,2-propanediyl, 1,2-propanediyl, 1,1-butanediyl, 1,2-butandiyl, 1,3-butanediyl, 1,4-butanediyl, 2,2-butanediyl, 1,1-dimethylethane-1,2-diyl or 1,2-dimethylethane-1,2-diyl.

$C_1$-$C_4$-Alkyl is a linear or branched alkyl group having from 1 to 4 carbon atoms, e.g. methyl, ethyl, n-propyl, isopropyl, n-butyl, 2-butyl, 2-methylpropane-1-yl or tert-butyl. $C_1$-$C_{10}$-Alkyl is a linear or branched alkyl group having from 1 to 10 carbon atoms, e.g. $C_1$-$C_4$-alkyl as mentioned above and also pentyl, hexyl, 1-methylpentyl, 2-methylpentyl, heptyl, octyl, 1-methylheptyl, 2-methylheptyl, 2,4,4-trimethylpentan-2-yl, 2-ethylhexyl, 1-ethylhexyl, nonyl, isononyl, decyl, 1-methylnonyl, 2-propylheptyl and the like.

$C_1$-$C_4$-Alkoxy is a linear or branched alkyl group which is bound via an oxygen atom and has from 1 to 4 carbon atoms, e.g. methoxy, ethoxy, n-propyloxy, isopropyloxy, n-butyloxy, 2-butyloxy, 2-methylpropan-1-yloxy or tert-butoxy. $C_1$-$C_{10}$-Alkoxy is a linear or branched alkyl group which is bound via an oxygen atom and has from 1 to 10 carbon atoms, e.g. $C_1$-$C_4$-alkoxy as mentioned above and also pentyloxy, hexyloxy, 1-methylpentyloxy, 2-methylpentyloxy, heptyloxy, octyloxy, 1-methylheptyloxy, 2-methylheptyloxy, 2,4,4-trimethylpentan-2-yloxy, 2-ethylhexyloxy, 1-ethylhexyloxy, nonyloxy, isononyloxy, decyloxy, 1-methylnonyloxy, 2-propylheptyloxy and the like.

In the use according to the invention, it has been found to be advantageous for the average number of repeating units Alk-O in the groups (Alk-O)$_n$, i.e. the average value of n in the formula A, based on the comb polymer, is at least 10, in particular at least 20 and especially at least 50, and does not exceed a value of 250, in particular 200 and especially 150. The value is preferably in the range from 10 to 250, in particular in the range from 20 to 200 and especially in the range from 50 to 150. The average value of n or the average number of repeating units Alk-O is the number average based on the comb polymer.

In the group (Alk-O)$_n$, the alkylene parts of the individual repeating units Alk-O can be identical or different. Alk-O is particularly preferably 1,2-ethanediyl or a mixture of 1,2-ethanediyl with 1,2-propanediyl. If the groups (Alk-O)$_n$ have differing units Alk-O, these can be arranged randomly or in blocks, with a blockwise arrangement being preferred. In particular, the particular Alk-O group which is bound to X is a group of the formula $CH_2CH_2O$.

Furthermore, it has been found to be advantageous for at least 50 mol %, in particular at least 80 mol %, particularly preferably 90 mol % and in particular 100%, of the Alk-O groups to be $CH_2$—$CH_2$—O. These percentages are in each case the number average based on the total amount of comb polymer.

If the group $(Alk-O)_n$ has different repeating units Alk-O, it has been found to be advantageous for, on average, at least 50 mol %, e.g. from 50 to 99 mol %, in particular at least 80 mol %, e.g. from 80 to 99 mol %, and especially at least 90 mol %, e.g. from 90 to 98 mol %, of the Alk-O groups to be $CH_2$—$CH_2$—O. Preference is here given to mixtures in which the remaining repeating units Alk-O are $CH(CH_3)$—$CH_2$—O.

The group Z in the formula A is preferably a 5- or 6-membered nitrogen heterocycle which has a ring member selected from among O, S, N, and NR groups and/or a carbonyl group as ring member in addition to the nitrogen atom bound to Y and the carbon ring members. In the group NR, R has the abovementioned meanings and is in particular hydrogen or methyl. Preference is here given to heterocycles which have a ring member selected from among O, N and NR groups and/or a carbonyl group as ring member. Examples of preferred radicals Z are pyrrolidon-1-yl, morpholin-4-yl, piperazin-1-yl, piperidon-1-yl, morpholin-2-on-4-yl, morpholin-3-on-4-yl, piperazin-1-yl, 4-methylpiperazin-1-yl, imidazolin-2-on-1-yl, 3-methylimidazolin-2-on-1-yl and imidazol-1-yl. Among these, particular preference is given to morpholin-1-yl and pyrrolidon-1-yl.

Furthermore, it has been found to be advantageous for Y in the formula A to be $C_2$-$C_4$-alkylene and in particular 1,2-ethanediyl or 1,3-propanediyl.

U is preferably a chemical bond, $CH_2$ or $CH(CH_3)$. In a particularly preferred embodiment, U is a chemical bond.

k is particularly preferably 1.

In the formula A, X is preferably O or NH and particularly preferably O.

In particular, the variables U, k, X, Y and Z and the variable n in the formula A all have the meanings indicated as preferred.

The groups B present in the comb polymers used according to the invention are typically present in the form of anionic groups, i.e. in deprotonated form, at pH values above 12. Examples of such groups are carboxylate (COOH or $COO^-$), sulfonate ($SO_3H$ or $SO_3^-$), phosphonate ($PO_3H_2$ or $PO_3H^-$ or $PO_3^{2-}$). Preference is given to at least 50 mol %, in particular at least 80 mol %, of the groups B being carboxylate groups.

In a preferred embodiment of the invention, the groups B are mostly (i.e. to an extent of at least 95 mol %, especially at least 99 mol %) or exclusively carboxylate groups. In another embodiment of the invention, the comb polymers have at least two different functional groups B; in this embodiment, preference is given to from 50 to 99 mol %, in particular from 80 to 99 mol %, of the functional groups B being carboxylate groups and the remaining 1 to 50 mol %, in particular from 1 to 20 mol %, being sulfonate groups.

The functional groups B can be bound to the carbon backbone of the polymer chain either directly or via a spacer. Typical spacers are $C_1$-$C_4$-alkanediyl, phenylene and groups of the formula

*—C(O)—X'-Alk'-, where X' is O, NH or $N(C_1$-$C_4$-alkyl), Alk' is $C_2$-$C_4$-alkylene, in particular 1,2-ethanediyl, 1,3-propanediyl, 1,2-propanediyl or 1-methyl-1,2-propanediyl and * is the point of bonding of the spacer to the polymer backbone. In a preferred embodiment of the invention, the group B is bound directly, i.e. via a single bond, to the carbon backbone of the comb polymer.

Furthermore, the comb polymer can further comprise, in addition to the abovementioned groups of the formula A and the functional groups B, groups of the formula C $$*-U'-(C(O))_p-X''-(Alk''-O)_q-R^a \qquad C$$

where

U' has the meanings given for U, p is 0 or 1, X'' has the meanings given for X, Alk'' has the meanings given above for Alk, q is an integer whose average value, based on the comb polymer, is in the range from 2 to 300, in particular in the range from 10 to 250, particularly preferably in the range from 20 to 200 and especially in the range from 50 to 150 (number average) and $R^a$ is selected from among hydrogen, $C_1$-$C_{10}$-alkyl, $C_1$-$C_{10}$-alkylcarbonyl, benzyl and benzoyl. In the formula C, p is particularly preferably 1. U' is particularly preferably a chemical bond. X'' is particularly preferably oxygen. $R^a$ is particularly preferably $C_1$-$C_4$-alkyl and especially methyl. What has been said above in respect of the preferred meanings of Alk applies analogously to Alk''.

Both the polyether groups A and the polyether groups C within the comb polymer can in principle be identical or different in respect of the number of repeating units n or q in the groups $(Alk-O)_n$ or $(Alk''-O)_q$, taking account of the fact that the groups A and C or the groups $(Alk-O)_n$ and $(Alk''-O)_q$ have a molecular weight distribution and n and q accordingly represent averages (number average) of these molecular weight distributions. The term "identical" therefore means that the molecular weight distribution of the groups A and C has one maximum. The term "different" correspondingly means that the molecular weight distribution of the groups A and C corresponds to a plurality of superimposed distributions and accordingly has a plurality of maxima. Comb polymers in which the molecular weight distributions of the groups A or, if present, the molecular weight distributions of the groups A are different from those of the groups C are preferred. Particular preference is given to comb polymers in which the number average molecular weights assigned in each case to one maximum differ from one another by at least 130 dalton and in particular at least 440 dalton. Accordingly, preference is given to comb polymers which have at least two types, e.g. 2, 3, 4, 5 or 6 types, of different groups A (hereinafter referred to as groups A1 and A2 or A1, A2 . . . Ai; i is an integer, e.g. 3, 4, 5 or 6), and in which the respective average values n(A1) and n(A2) or n(Ai) differ by a value of at least 3 and in particular at least 10. Accordingly, preference is also given to comb polymers which have groups of the formula A and the formula C and in which the average values of n and q differ by a value of at least 3 and in particular at least 10.

In the comb polymers employed according to the invention, the polyether groups of the formula A and the functional groups B are typically present in a molar ratio of A:B in the range from 2:1 to 1:20, frequently in the range from 1.5:1 to 1:15, in particular in the range from 1:1 to 1:10 and especially in the range from 1:1.1 to 1:8 (averaged over the total amount of comb polymers). If the comb polymer has polyether groups of the formula C, the molar ratio of polyether groups of the formula A and C to the functional groups B, i.e. the molar ratio of (A+C):B, is typically in the range from 2:1 to 1:20, frequently in the range from 1.5:1 to 1:15, in particular in the range from 1:1 to 1:10 and especially in the range from 1:1.1 to 1:8 (averaged over the total amount of comb polymers).

Apart from the abovementioned groups of the formula A, the functional groups B and the groups C which may be present if appropriate, the comb polymer can also bear a lesser amount of functional groups C' on the carbon backbone. Such groups include, in particular, nitrile groups, groups of the formula Z as defined above and $C_1$-$C_8$-alkoxycarbonyl groups in which the alkoxy radical may bear one or more hydroxy groups.

The proportion of functional groups C' will preferably not exceed 30 mol %, in particular 20 mol %, based on the total amount of functional groups A, B, C if present and C', and is, if groups C' are present, typically in the range from 1 to 30 mol % and in particular in the range from 2 to 20 mol %. In a preferred embodiment, the comb polymer has no functional groups C' or less than 2 mol %, in particular less than 1 mol %, of functional groups C'.

In a preferred embodiment, the comb polymer comprises from 5 to 80 mol %, in particular from 10 to 60 mol %, in each case based on the total amount of the functional groups A, B, C and if present C', of groups of the formula C. In this embodiment, the molar ratio of the side chains A to the groups C, i.e. the molar ratio of A:C, is preferably in the range from 1:10 to 20:1, in particular in the range from 1:2 to 10:1. In another preferred embodiment of the invention, the comb polymer has no groups of the formula C' or less than 5 mol %, in particular less than 1 mol %, of groups of the formula C', in each case based on the total amount of groups A, B, C and C'.

In addition, the comb polymer can also bear hydrocarbon radicals, e.g. $C_1$-$C_4$-alkyl groups or phenyl groups, on the carbon backbone. In a preferred embodiment of the invention, the carbon backbone has $C_1$-$C_4$-alkyl groups, in particular methyl groups, on at least every 4th carbon atom of the polymer chain.

Furthermore, it has been found to be advantageous for on average (number average) at least every 4th carbon atom of the polymer backbone and in particular at least every 3rd carbon atom to bear a group of the formula A or if appropriate C or a functional group B. It has also been found to be advantageous for on average (number average) at least one carbon atom which is not substituted by a group A, B or if appropriate C to be located between any two carbon atoms substituted by A, B or if appropriate C in the polymer backbone.

The number average molecular weight (MN) of the comb polymers is generally in the range from 1000 to 200 000 daltons. With a view to the use of the comb polymers, preference is given to those having a number average molecular weight of from 5000 to 100 000 daltons. The number average molecular weight MN can be determined in a customary fashion by gel permeation chromatography, as explained in the examples. The K values of the copolymers which can be obtained according to the invention, determined by the method indicated below, are generally in the range from 10 to 100, preferably in the range from 15 to 80 and in particular in the range from 20 to 60.

The comb polymers can be used in the form of the free acid or in the form of its salts, with some or all of the groups B being able to be present in neutralized form in the salt form. If the comb polymers are used in the form of the salts, they have cations as counterions to achieve electrical neutrality. Suitable cations are alkali metal cations such as $Na^+$ and $K^+$, alkaline earth metal cations such as $Mg^{++}$ and $Ca^{++}$, and ammonium ions such as $NH_4^+$, $[NR^bR^cR^dR^e]^+$, where $R^b$ is $C_1$-$C_4$-alkyl or hydroxy-$C_2$-$C_4$-alkyl and the radicals $R^c$, $R^d$ and $R^e$ are selected independently from among hydrogen, $C_1$-$C_4$-alkyl and hydroxy-$C_2$-$C_4$-alkyl. Preferred counterions are the alkali metal cations, in particular $Na^+$ and $K^+$.

The comb polymers of the invention can be prepared by methods analogous to known methods for preparing such comb polymers, e.g. by methods analogous to the methods described in the prior art cited at the outset and methods analogous to the methods described in WO 01/40337, WO 01/40338, WO 01/72853 or WO 02/50160, whose disclosure is hereby incorporated by reference.

Suitable processes for preparing the comb polymers are, in particular:
i) copolymerization of ethylenically unsaturated monomers M comprising
   a) neutral monoethylenically unsaturated monomers M1 which bear one or two groups of the formula A and
   b) monoethylenically unsaturated monomers M2 which bear one or two functional groups B,
ii) hompolymerization or copolymerization of ethylenically unsaturated monomers M comprising
   a) monoethylenically unsaturated monomers M3 which bear a group of the formula A and a functional group B and, if appropriate,
   b) monoethylenically unsaturated monomers M2 which bear one or two functional groups B,
and
iii) polymer-analogous reaction of homopolymers or copolymers having a carbon backbone which bear free carboxyl groups or ester-forming derivatives of carboxyl groups with alcohols of the formula HO-(Alk-O)$_n$—Y-Z or amines of the formula HNR-(Alk-O)$_n$—Y-Z, where n, Alk, R, Y and Z are as defined above.

The three processes i), ii) and iii) all lead to comb polymers according to the invention, with the structure of the comb polymers which can be obtained naturally depending in a manner known per se on the preparative method selected in each case and on the amount and type of starting materials used. Thus, for example, the type and amount of the side chains A and the functional groups B in the comb polymers obtainable by the preparative methods i) and ii) depend in a manner known per se on the type and the relative amount of the monomers M1 and M2 or M3 and if appropriate M2 used. The molecular weight of the comb polymers can in turn be controlled in a manner known per se by means of the reaction conditions selected in the polymerization, e.g. by the initiator used, any regulators used, the temperature, the reaction medium, concentration of the monomers, etc., in the preparative methods i) and ii). In the case of the comb polymers which can be obtained by the preparative method iii), the structure and the molecular weight is naturally largely determined by the homo or copolymer used and by the alcohols HO-(Alk-O)$_n$—Y-Z or amines of the formula HNR-(Alk-O)$_n$—Y-Z used for carrying out the modification.

The comb polymers which can be obtained by the method i) are preferred according to the invention and thus constitute particularly preferred subject matter of the invention.

In the process i) for preparing the comb polymers, the type and amount of the monomers M determine the type and number of the side chains of the formula A.

Preferred monomers M1 are ones in which k in the formula A is 1. Preferred monomers M1 are therefore selected from among the esters of monoethylenically unsaturated $C_3$-$C_8$-monocarboxylic acids and diesters of monoethylenically unsaturated $C_4$-$C_8$-dicarboxylic acids with alcohols of the formula HO-(Alk-O)$_n$—Y-Z, where n, Alk, Y and Z are as defined above, and the amides of monoethylenically unsaturated $C_3$-$C_8$-monocarboxylic acids with amines of the formula NHR-(Alk-O)$_n$—Y-Z, where n, Alk, R, Y and Z are as defined above.

Preferred esters of monoethylenically unsaturated $C_3$-$C_8$-monocarboxylic acids are the esters of acrylic acid and methacrylic acid.

Examples of diesters of monoethylenically unsaturated $C_4$-$C_8$-dicarboxylic acids are the esters of fumaric acid, itaconic acid and maleic acid.

Preferred amides of monoethylenically unsaturated $C_3$-$C_8$-monocarboxylic acids are the amides of acrylic acid and methacrylic acid.

Further possible monomers M1 are vinyl, allyl and methallyl ethers of alcohols of the formula HO-(Alk-O)$_n$—Y-Z, where n, Alk, Y and Z are as defined above.

The monomers M1 preferably comprise at least 80 mol %, in particular at least 90 mol %, based on the total amount of the monomers M1, of esters of monoethylenically unsaturated $C_3$-$C_8$-monocarboxylic acids, in particular esters of acrylic acid and methacrylic acid. In particular, the monomers M1 are selected from among the abovementioned esters of monoethylenically unsaturated $C_3$-$C_8$-monocarboxylic acids and especially from among the esters of acrylic acid and methacrylic acid.

Monomers M2 include:

M2a monoethylenically unsaturated monocarboxylic and dicarboxylic acids having from 3 or 4 to 8 carbon atoms, e.g. acrylic acid, methacrylic acid, crotonic acid, isocrotonic acid, maleic acid, fumaric acid and itaconic acid, M2b monoethylenically unsaturated sulfonic acids preferably having from 2 to 10 carbon atoms and their salts, in particular their alkali metal salts, e.g. vinylsulfonic acid, allylsulfonic acid, methallylsulfonic acid, styrenesulfonic acid, 2-acryloxyethanesulfonic acid, 2-acrylamido-2-methylpropanesulfonic acid, and M2c monoethylenically unsaturated phosphonic acids preferably having from 2 to 10 carbon atoms, e.g. vinylphosphonic acid, allylphosphonic acid, 2-acryloxyethanephosphonic acid, 2-acrylamido-2-methylpropanephosphonic acid, M2d monoesters of monoethylenically unsaturated dicarboxylic acids having from 4 to 8 carbon atoms, in particular monoesters of maleic acid, fumaric acid and itaconic acid with $C_1$-$C_{10}$-alkanols, in particular with $C_1$-$C_4$-alkanols, e.g. the monomethyl, monoethyl or monobutyl esters of these acids, and also the monoesters of these acids with alcohols of the formula HO(Alk"-O)$_q$—R$^a$, where q, Alk" and R$^a$ are as defined above, and the salts of these monomers, in particular their alkali metal salts.

Preferred monomers M2 comprise at least 50 mol %, in particular at least 70 mol %, based on the total amount of the monomers M2, of monoethylenically unsaturated monocarboxylic and dicarboxylic acids having from 3 or 4 to 8 carbon atoms, particularly preferably acrylic acid and methacrylic acid. In a preferred embodiment, the monomers M2 are selected from among monoethylenically unsaturated monocarboxylic and dicarboxylic acids having from 3 or 4 to 8 carbon atoms, in particular from among acrylic acid and methacrylic acid. In another embodiment of the invention, the monomers M2 comprise from 50 to 99 mol %, in particular from 70 to 95 mol %, based on the total amount of the monomers M2, of monoethylenically unsaturated monocarboxylic and dicarboxylic acids having from 3 or 4 to 8 carbon atoms, particularly preferably acrylic acid and methacrylic acid, and from 1 to 50 mol %, in particular from 5 to 35 mol %, based on the total amount of the monomers M2, of monoethylenically unsaturated sulfonic acids preferably having from 2 to 10 carbon atoms.

The monomers M3 include, in particular, monoesters of monoethylenically unsaturated $C_4$-$C_8$-dicarboxylic acids with alcohols of the formula HO-(Alk-O)$_n$—Y-Z, where n, Alk, Y and Z are as defined above, especially the monoesters of maleic acid, fumaric acid and itaconic acid.

In addition, the monomers M can comprise further monomers M4 and M5.

Monomers M4 are monoethylenically unsaturated monomers which bear one or two groups of the formula C and, if appropriate, a functional group B. They include vinyl, allyl and methallyl ethers of alcohols of the formula HO(Alk"-O)$_q$—R$^a$, where q, Alk" and R$^a$ are as defined above, also the esters of these alcohols of monoethylenically unsaturated mono-$C_3$-$C_8$-carboxylic acids and the monoesters and diesters of these alcohols with monoethylenically unsaturated di-$C_4$-$C_8$-carboxylic acids. Preferred monomers M4 are esters of monoethylenically unsaturated mono-$C_3$-$C_8$-carboxylic acids, in particular acrylic acid and methacrylic acid, with alcohols of the formula HO(Alk"-O)$_q$—R$^a$, where q, Alk" and R$^a$ are as defined above, and also diesters of monoethylenically unsaturated di-$C_4$-$C_8$-carboxylic acids, in particular maleic acid, fumaric acid, citraconic acid and itaconic acid, with alcohols of the formula HO(Alk"-O)$_q$—R$^a$. Particularly preferred monomers M4 are the esters of monoethylenically unsaturated mono-$C_3$-$C_8$-carboxylic acids, in particular acrylic acid and methacrylic acid.

The monomers M4 preferably make up no more than 80 mol %, in particular no more than 60 mol %, of the total amount of the monomers M. In a preferred embodiment of the invention, the proportion of monomers M4 is from 5 to 80 mol %, in particular from 10 to 60 mol %, based on the total amount of the monomers M, in the processes i) and ii) for preparing the comb polymers. In another embodiment of the invention, their proportion in the monomers M is less than 5 mol %, in particular less than 1 mol %. What has been said above with regard to the molar ratio of the functional groups A:C applies analogously to the molar ratio of monomers M1 to M4 or of monomers M3 to M4.

Monomers M5 include the monomers M5a, M5b, M5c, M5d and M5e:

M5a $C_1$-$C_{10}$-alkyl esters and $C_5$-$C_{10}$-cycloalkyl esters of monoethylenically unsaturated mono-$C_3$-$C_8$-carboxylic acids, in particular acrylic acid and methacrylic acid, with $C_1$-$C_{10}$-alkanols or $C_3$-$C_{10}$-cycloalkanols, e.g. methyl acrylate, ethyl acrylate, n-propyl acrylate, isopropyl acrylate, n-butyl acrylate, isobutyl acrylate, tert-butyl acrylate, n-hexyl acrylate, 2-ethylhexyl acrylate, cyclohexyl acrylate and the corresponding methacrylic esters, and corresponding di-$C_1$-$C_{10}$-alkyl esters and di-$C_5$-$C_{10}$-cycloalkyl esters of monoethylenically unsaturated di-$C_4$-$C_8$-carboxylic acids, M5b hydroxy-$C_2$-$C_{10}$-alkyl esters of monoethylenically unsaturated mono- and di-$C_3$-$C_8$-carboxylic acids, in particular acrylic acid and methacrylic acid, e.g. 2-hydroxyethyl acrylate, 3-hydroxypropyl acrylate, 4-hydroxybutyl acrylate, 2-hydroxyethyl methacrylate, 3-hydroxypropyl methacrylate and 4-hydroxybutyl methacrylate, M5c monoethylenically unsaturated nitriles such as acrylonitrile, M5d vinylaromatic monomers such as styrene and vinyltoluenes, M5e olefins preferably having from 2 to 12 carbon atoms, e.g. ethylene, propene, 1-butene, isobutene, 1-hexene, diisobutene, 1-octene, 1-decene, 1-dodecene, etc.

Preferred monomers M5 are the monomers M5b.

The monomers M5 preferably make up no more than 30 mol %, in particular no more than 20 mol %, of the total amount of the monomers M. If desired, their proportion is generally from 1 to 30 mol %, in particular from 5 to 20 mol %, of the monomers M in the processes i) and ii) for preparing the comb polymers. In particular, their proportion of the monomers M is less than 5 mol %, in particular less than 1 mol %.

In the process i), the molar ratio of side chains A to functional groups B and if appropriate C and C' is usually given directly by the molar ratio of the monomers M1 to the monomers M2 or by the molar ratio of the monomers M1:M2:M4:M5. Accordingly, the molar ratio of M1:M2 or (M1+M4):M2 in the case of monobasic acids is generally in the range from 2:1 to 1:20, in particular in the range from 1:1 to 1:10 and especially in the range from 1:1.1 to 1:8. If the monomers M in the process i) for preparing the comb polymers comprise monomers M2 having more than one acid group or monomers M3, the molar ratio of the monomers is obtained in a corresponding way.

Accordingly, the amount of monomers M1 in the process i) for preparing the comb polymers is typically from 5 to 65 mol %, in particular from 10 to 50 mol %, and the amount of monomers M2 is from 35 to 95 mol %, in particular from 50 to 90 mol %, with the proportion of any further monomers M3 to M5 being able to be up to 30 mol %, in particular up to 20 mol %, and the proportion of the monomers M4 being able to be up to 80 mol %, in particular up to 60 mol %, e.g. from 5 to 80 mol %, in particular from 10 to 60 mol %, in each case based on the total number of moles of the monomers M, with the number of moles of all monomers M of course adding up to 100 mol %, unless indicated otherwise.

In the process ii), the molar ratio of side chains A to functional groups B is given in a manner analogous to the process i) by the molar ratio of the monomers M3 to any monomers M2 or M1 or M4 used. An analogous situation applies to the relationship between the molar ratio of side chains A to side chains C or to functional groups B.

Accordingly, the amount of the monomers M3 in the process ii) for preparing the comb polymers is typically from 40 to 100 mol %, in particular from 50 to 95 mol %, and the amount of monomers M2 is from 0 to 60 mol %, in particular from 5 to 50 mol %, with the number of moles of any further monomers M2 or M5 being able to be up to 30 mol %, in particular up to 20 mol %, and the proportion of monomers M4 being able to be up to 80 mol %, in particular up to 60 mol %, e.g. from 5 to 80 mol %, in particular from 10 to 60 mol %, in each case based on the total number of moles of the monomers M, with the number of moles of all monomers M of course adding up to 100 mol %, unless indicated otherwise.

In addition, it can be advantageous to carry out the polymerization of the monomers M in the presence of small amounts of multiply ethylenically unsaturated monomers having, for example, 2, 3 or 4 polymerizable double bonds (crosslinkers) in order to increase the molecular weight of the polymers. Examples of such crosslinkers are diesters and triesters of ethylenically unsaturated carboxylic acids, in particular the bisacrylates and trisacrylates of diols or polyols having 3 or more OH groups, e.g. the bisacrylates and bismethacrylates of ethylene glycol, diethylene glycol, triethylene glycol, neopentyl glycol or polyethylene glycols. Such crosslinkers are, if desired, used in an amount of generally from 0.01 to 5% by weight, based on the total amount of the monomers M to be polymerized. Preference is given to using less than 0.01% by weight of crosslinker monomers and in particular no crosslinker monomers.

The polymerization of the monomers M is usually carried out in the presence of compounds which form free radicals, known as initiators. Such compounds are usually used in amounts of up to 30% by weight, preferably from 0.05 to 15% by weight, in particular from 0.2 to 8% by weight, based on the monomers to be polymerized. In the case of initiators consisting of a plurality of constituents (initiator systems, e.g. redox initiator systems), the abovementioned percentages by weight are based on the sum of the components.

Suitable initiators are, for example, organic peroxides and hydroperoxides, also peroxodisulfates, percarbonates, peroxyesters, hydrogen peroxide and azo compounds. Examples of initiators are hydrogen peroxide, dicyclohexyl peroxydicarbonate, diacetyl peroxide, di-tert-butyl peroxide, diamyl peroxide, dioctanoyl peroxide, didecanoyl peroxide, dilauroyl peroxide, dibenzoyl peroxide, bis(o-tolyl) peroxide, succinyl peroxide, methyl ethyl ketone peroxide, di-tert-butyl hydroperoxide, acetylacetone peroxide, butyl peracetate, tert-butyl permaleate, tert-butyl perisobutyrate, tert-butyl perpivalate, tert-butyl peroctoate, tert-butyl perneodecanoate, tert-butyl perbenzoate, tert-butyl hydroperoxide, cumene hydroperoxide, tert-butyl perneodecanoate, tert-amyl perpivalate, tert-butyl perpivalate, tert-butyl perbenzoate, tert-butyl peroxy-2-ethylhexanoate and diisopropyl peroxydicarbamate; also lithium, sodium, potassium and ammonium peroxodisulfate, azo initiators 2,2'-azobisisobutyronitrile, 2,2'-azobis(2-methylbutyronitrile), 2,2'-azobis[2-methyl-N-(2-hydroxyethyl)propionamide], 1,1'-azobis(1-cyclohexanecarbonitrile), 2,2'-azobis(2,4-dimethylvaleronitrile), 2,2'-azobis(N,N'-dimethyleneisobutyroamidine) dihydrochloride and 2,2'-azobis(2-amidinopropane) dihydrochloride, and also the redox initiator systems mentioned below.

Redox initiator systems comprise at least one peroxide-comprising compound in combination with a redox coinitiator e.g. a sulfur compound having a reducing action, e.g. bisulfites, sulfites, thiosulfates, dithionites and tetrathionates of alkali metals or of ammonium compounds. Thus, it is possible to use combinations of peroxodisulfates with alkali metal or ammonium hydrogensulfites, e.g. ammonium peroxodisulfate and ammonium disulfite. The ratio of the peroxide-comprising compound to the redox coinitiator is from 30:1 to 0.05:1.

The initiators can be employed either alone or in admixture with one another, e.g. mixtures of hydrogen peroxide and sodium peroxodisulfate.

The initiators can be either water-soluble or insoluble or only slightly soluble in water. The polymerization in an aqueous medium is preferably carried out using water-soluble initiators, i.e. initiators which are soluble in the aqueous polymerization medium in the concentration usually used for the polymerization. These include peroxodisulfates, azo initiators having ionic groups, organic hydroperoxides having up to 6 carbon atoms, acetone hydroperoxide, methyl ethyl ketone hydroperoxide and hydrogen peroxide, and also the abovementioned redox initiators. In a particularly preferred embodiment of the polymerization processes i) and ii), the initiator used comprises at least one peroxodisulfate, e.g. sodium peroxodisulfate.

Transition metal catalysts, e.g. salts of iron, cobalt, nickel, copper, vanadium and manganese, can be additionally used in combination with the initiators or the redox initiator systems. Suitable salts are, for example, iron(II) sulfate, cobalt(II) chloride, nickel(II) sulfate, and copper(I) chloride. Based on the monomers, the transition metal salt having a reducing action is used in a concentration of from 0.1 ppm to 1000 ppm. Thus, it is possible to use combinations of hydrogen peroxide with iron(II) salts, for example 0.5-30% of hydrogen peroxide and 0.1-500 ppm of Mohr's salt.

In the polymerization of the monomers M in organic solvents, too, redox coinitiators and/or transition metal catalysts, e.g. benzoin, dimethylaniline, ascorbic acid and complexes of heavy metals such as copper, cobalt, iron, manganese, nickel and chromium which are soluble in organic solvents, can be used in combination with the abovementioned initiators. The amounts of redox coinitiators or transition metal catalysts which are usually used are from about 0.1 to 1000 ppm, based on the amounts of monomers used.

To control the mean molecular weight of the comb polymers which can be obtained according to the invention, it is often advantageous to carry out the polymerization of the monomers M in the presence of regulators. For this purpose, it is possible to use customary regulators, in particular organic compounds comprising SH groups, in particular water-soluble compounds comprising SH groups, e.g. 2-mercaptoethanol, 2-mercaptopropanol, 3-mercaptopropionic acid, cysteine, N-acetylcysteine, also phosphorus(III) or phosphorus(I) compounds such as alkali metal or alkaline earth metal hypophosphites, e.g. sodium hypophosphite, and also hydrogensulfites such as sodium hydrogensulfite. The polymerization regulators are generally used in amounts of from 0.05 to 10% by weight, in particular from 0.1 to 2% by weight, based on the monomers M. Preferred regulators are the abovementioned compounds bearing SH groups, in particular water-soluble compounds bearing SH groups, e.g. 2-mercapto-ethanol, 2-mercaptopropanol, 3-mercaptopropionic acid, cysteine and N-acetylcysteine. In the case of these compounds, it has been found to be particularly useful to employ them in an amount of from 0.05 to 2% by weight, in particular from 0.1 to 1% by weight, based on the monomers. The abovementioned phosphorus(III) and phosphorus(I) compounds and the hydrogensulfites are usually employed in larger amounts, e.g. from 0.5 to 10% by weight and in particular from 1 to 8% by weight, based on the monomers to be polymerized. The mean molecular weight can also be influenced by the choice of the appropriate solvent. Thus, polymerization in the presence of diluents having benzylic or allylic H atoms leads to a reduction in the mean molecular weight as a result of chain transfer.

The polymerization of the monomers can be carried out by the customary polymerization processes including solution, precipitation, suspension or bulk polymerization. Preference is given to the method of solution polymerization, i.e. polymerization in solvents or diluents.

Suitable solvents or diluents include both aprotic solvents, e.g. the above-mentioned aromatics such as toluene, o-xylene, p-xylene, cumene, chlorobenzene, ethylbenzene, industrial mixtures of alkylaromatics, aliphatics and cycloaliphatics such as cyclohexane and industrial mixtures of aliphatics, ketones such as acetone, cyclohexanone and methyl ethyl ketone, ethers such as tetrahydrofuran, dioxane, diethyl ether, tert-butyl methyl ether, and $C_1$-$C_4$-alkyl esters of aliphatic $C_1$-$C_4$-carboxylic acids, e.g. methyl acetate and ethyl acetate, and protic solvents such as glycols and glycol derivatives, polyalkylene glycols and derivatives thereof, $C_1$-$C_4$-alkanols, e.g. n-propanol, n-butanol, isopropanol, ethanol or methanol, and also water and mixtures of water with $C_1$-$C_4$-alkanols, e.g. isopropanol/water mixtures. The copolymerization process according to the invention is preferably carried out in water or a mixture of water with up to 60% by weight of $C_1$-$C_4$-alkanols or glycols as solvent or diluent. Particular preference is given to using water as sole solvent.

The polymerization of the monomers M is preferably carried out with substantial or complete exclusion of oxygen, preferably in a stream of inert gas, e.g. a stream of nitrogen.

The process for polymerizing the monomers M can be carried out in the apparatuses customary for polymerization methods. These include stirred vessels, cascades of stirred vessels, autoclaves, tube reactors and kneaders.

The polymerization of the monomers M is usually carried out at temperatures in the range from 0 to 300° C., preferably in the range from 40 to 120° C. The polymerization time is usually in the range from 0.5 h to 15 h and in particular in the range from 2 to 6 h. The pressure prevailing in the polymerization is of subordinate importance for the success of the polymerization and is generally in the range from 800 mbar to 2 bar and is frequently ambient pressure. When volatile solvents or volatile monomers are used, the pressure can also be higher.

With regard to further details of the polymerization process, EP-A 560602, EP-A 734359, EP-A 799807, EP-A 994290, WO 01/40337, WO 01/40338 and PCT/EP 2005/009466 are incorporated by reference. The polymerization conditions described there can be used in an analogous way for preparing the comb polymers of the invention.

The monomers M2, M4 and M5 are known compounds which are mostly commercially available.

Some of the monomers M1 and M3 have been described in the prior art, while the monomers M1 and M3 in which n in group A is on average a number in the range from 11 to 300, in particular in the range from 20 to 200, especially in the range from 50 to 200 and very especially in the range from 50 to 150, and at least 90 mol % of the repeating units Alk-O in the group A are $CH_2CH_2O$ are novel and constitute further subject matter of the present invention. They can be prepared by methods analogous to known methods of the prior art. With regard to random and blockwise arrangement of various Alk-O units, what has been said above for the group A applies.

Preferred monomers M1 in which k in the formula A is 1 can be prepared by esterification of monoethylenically unsaturated $C_3$-$C_8$-monocarboxylic acids or monoethylenically unsaturated $C_4$-$C_8$-dicarboxylic acids with alcohols of the formula HO-(Alk-O)$_n$—Y-Z, where n, Alk, Y and Z are as defined above, or by amidation of monoethylenically unsaturated $C_3$-$C_8$-monocarboxylic acids with amines of the formula NHR-(Alk-O)$_n$—Y-Z, where n, Alk, R, Y and Z are as defined above. In place of the $C_3$-$C_8$-monocarboxylic acids or $C_4$-$C_8$-dicarboxylic acids, it is also possible to use ester- or amide-forming derivatives of these acids, in particular the anhydrides of the acids. Such processes are known from the prior art.

Thus, for example, esters of monoethylenically unsaturated $C_3$-$C_8$-monocarboxylic acids or $C_4$-$C_8$-dicarboxylic acids with alcohols of the formula HO-(Alk-O)$_n$—Y-Z can be prepared by one of the measures a), b) or c) below:

a) acid-catalyzed esterification of monoethylenically unsaturated $C_3$-$C_8$-monocarboxylic acids or $C_4$-$C_8$-dicarboxylic acids with alcohols of the formula HO-(Alk-O)$_n$—Y-Z, for example using a method analogous to the methods described in DE-A 2516933, EP-A 884290, EP-A 989108, EP-A 989109, WO 01/40337, WO 01/40338 and WO 02/50160;

b) transesterification of mono- or di-$C_1$-$C_4$-alkyl esters of monoethylenically unsaturated $C_3$-$C_8$-monocarboxylic acids or $C_4$-$C_8$-dicarboxylic acids with alcohols of the formula HO-(Alk-O)$_n$—Y-Z in the presence of basic or acidic transesterification catalysts using a method analogous to that described in DE-A 19602035, U.S. Pat. No. 5,037,978, EP-A 799807 or using enzyme catalysis as in the process described in EP-A 999229;

c) reaction of anhydrides of monoethylenically unsaturated $C_3$-$C_8$-monocarboxylic acids or $C_4$-$C_8$-dicarboxylic acids with alcohols of the formula HO-(Alk-O)$_n$—Y-Z, for example using a method analogous to that described in WO 01/74736 or in the earlier patent application PCT/EP 2005/009466, with, as a deviation from the methods described there, the addition of a base being able to be dispensed with in some cases.

Amides of monoethylenically unsaturated $C_3$-$C_8$-monocarboxylic acids with amines of the formula HNR-(Alk-O)$_n$—Y-Z can be prepared using methods analogous to known amidation reactions by amidation of monoethylenically unsaturated $C_3$-$C_8$-monocarboxylic acids or their amide-forming derivatives such as acid chlorides, acid anhydrides or $C_1$-$C_4$-alkyl esters with amines.

Ethylenically unsaturated ethers or amines, i.e. monomers M1 having a group A in which k=0, can be prepared by etherification or vinylation of alcohols of the formula HO-(Alk-O)$_n$—Y-Z or by alkenylation or enamine formation of/from amines of the formula HNR-(Alk-O)$_n$—Y-Z using methods analogous to standard methods of the prior art.

The monomers M3 can be prepared by methods analogous to the methods described here for the monomers M1. In particular, the preferred monomers M3 are prepared by reacting anhydrides of monoethylenically unsaturated $C_4$-$C_8$-dicarboxylic acids with alcohols of the formula HO-(Alk-O)$_n$—Y-Z under conditions which lead to monoester formation.

In a preferred embodiment of the invention, the particularly preferred monomers M1 are prepared by reacting anhydrides of monoethylenically unsaturated $C_3$-$C_8$-monocarboxylic acids, in particular acrylic anhydride or methacrylic anhydride, with alcohols of the formula HO-(Alk-O)$_n$—Y-Z. In contrast to the processes known from the prior art, this process leads to particularly good yields when alcohols of the formula HO-(Alk-O)$_n$—Y-Z are used and therefore constitutes further subject matter of the invention.

Here, it has been found to be advantageous to use the anhydride in an equimolar amount or in a small excess, preferably an excess of no more than 10 mol %, frequently 9.5 mol %, preferably 9 mol %, in particular 8.5 mol % and especially 8 mol %, based on 1 mol of the alcohol, i.e. the amount of anhydride is typically not more than 1.095 mol, preferably not more than 1.09 mol, in particular not more than 1.085 mol and especially not more than 1.08 mol, per mol of alcohol. Preference is given to using at least 1.005 mol, in particular at least 1.01 mol and particularly preferably at least 1.02 mol, of anhydride per mol of alcohol.

In an embodiment of the invention, the reaction of the anhydride with the alcohol is carried out in the absence of a base, in particular when the nitrogen heterocycle Z is a basic radical. In another embodiment of the invention, the reaction of the anhydride with the alcohol is carried out in the presence of a base. Here, preference is given to bases which are insoluble or only slightly soluble in the alcohol at 90° C., i.e. the solubility of the base in the alcohol at 90° C. is not more than 10 g/l and in particular not more than 5 g/l.

Examples of such bases include hydroxides, oxides, carbonates and hydrogencarbonates of monovalent or divalent metal cations, in particular of elements of the first and second main groups of the Periodic Table, i.e. $Li^+$, $Na^+$, $K^+$, $Rb^+$, $Cs^+$, $Be^{2+}$, $Mg^{2+}$, $Ca^{2+}$, $Sr^{2+}$ and $Ba^{2+}$, and monovalent or divalent transition metal cations or cations of the fourth main group of the Periodic Table such as $Ag^+$, $Fe^{2+}$, $Co^{2+}$, $Ni^{2+}$, $Cu^{2+}$, $Zn^{2+}$, $Cd^{2+}$, $Sn^{2+}$, $Pb^{2+}$, $Ce^{2+}$. Preference is given to the hydroxides, oxides, carbonates and hydrogencarbonates of cations of the alkali and alkaline earth metals and also of $Zn^{2+}$ and in particular of $Mg^{2+}$ or $Ca^{2+}$ and particularly preferably of $Na^+$ or $K^+$. Among these, preference is given to the hydroxides and carbonates of these metal ions, in particular the alkali metal carbonates and alkali metal hydroxides and especially sodium carbonate, potassium carbonate, potassium hydroxide and sodium hydroxide. Lithium hydroxide and lithium carbonate are also particularly useful. The base is preferably used in an amount of from 0.05 to 0.5 base equivalents and in particular in an amount of from 0.1 to 0.4 base equivalents, based on the alcohol, with larger amounts of base, e.g. up to 1 base equivalent, generally not being disadvantageous. Here, it should be taken into account that in the case of hydroxides and hydrogen carbonates, the base equivalents correspond to the molar equivalents used, while 1 molar equivalent of a carbonate or oxide corresponds in each case to 2 base equivalents.

The reaction of the anhydride with the alcohol is preferably carried out at temperatures in the range from 0 to 150° C., in particular in the range from 20 to 130° C. and particularly preferably in the range from 50 to 100° C. The pressure prevailing in the reaction is of subordinate importance for the success of the reaction and is generally in the range from 800 mbar to 2 bar and is frequently ambient pressure. The reaction is preferably carried out in an inert gas atmosphere. The reaction of the anhydride with the compound P can be carried out in all apparatuses customary for such reactions, e.g. in a stirred vessel, in cascades of stirred vessels, autoclaves, tube reactors or kneaders.

The reaction of the anhydride with the alcohol is preferably carried out until a conversion of the alcohol used of at least 80%, in particular at least 90% and particularly preferably at least 95%, has been reached. The reaction times required for this will in general not exceed 5 hours and are frequently less than 4 hours. The conversion can be monitored by $^1$H-NMR spectroscopy of the reaction mixture, preferably in the presence of a strong acid such as trifluoroacetic acid.

The reaction of the anhydride with the alcohol can be carried out in bulk, i.e. without addition of solvents, or in inert solvents or diluents. Inert solvents are generally aprotic compounds. Inert solvents include optionally halogenated aromatic hydrocarbons such as toluene, o-xylene, p-xylene, cumene, chlorobenzene, ethylbenzene, industrial mixtures of alkylaromatics, aliphatic and cycloaliphatic hydrocarbons such as hexane, heptane, octane, isooctane, cyclohexane, cycloheptane, industrial mixtures of aliphatics, also ketones such as acetone, methyl ethyl ketone, cyclohexanone, also ethers such as tetrahydrofuran, dioxane, diethyl ether, tert-butyl methyl ether and also mixtures of the abovementioned solvents, e.g. toluene/hexane. The reaction is preferably carried out without solvents or with only very small amounts of solvents, generally less than 10% by weight, based on the starting materials, i.e. in bulk.

It has been found to be advantageous for the reaction of the anhydride with the alcohol to be carried out in a reaction medium which comprises less than 0.2% by weight and in particular less than 1000 ppm of water (determined by Karl-Fischer titration). The term "reaction medium" refers to the mixture of the reactants with the base and with any solvent and inhibitor used. In the case of moisture-comprising starting materials, it has been found to be useful to remove the water before the reaction, e.g. by distillation and particularly preferably by distillation with addition of an organic solvent which forms a low-boiling azeotrope with water. Examples of such solvents are the above-mentioned aromatic solvents such as toluene, o-xylene, p-xylene, cumene, benzene, chlorobenzene, ethylbenzene and industrial mixtures of aromatics, also aliphatic and cycloaliphatic solvents such as hexane, heptane, cyclohexane and industrial mixtures of aromatics and mixtures of the abovementioned solvents.

To carry out the reaction, it is usual to react the reaction mixture comprising the alcohol, the anhydride and the base and, if appropriate, solvent and, if appropriate, inhibitor at the abovementioned temperatures in a suitable reaction vessel. Preference is given to placing the alcohol and the base and, if appropriate, the solvent in a reaction vessel and adding the anhydride. The anhydride is preferably added at the reaction temperature.

If the starting materials comprise water, the water is preferably removed before addition of the anhydride. For example, the alcohol and, if appropriate, the base and, if appropriate, the solvent are placed in a reaction vessel, any moisture present is subsequently removed in the above-described manner and the anhydride is then added, preferably at the reaction temperature.

In addition, it has been found to be useful to carry out the reaction of the anhydride with the alcohol in the presence of a polymerization inhibitor so as to avoid an uncontrolled polymerization. Suitable polymerization inhibitors are those known for such reactions, in particular phenols such as hydroquinone, hydroquinone monomethyl ether, especially sterically hindered phenols such as 2,6-di-tert-butylphenol or 2,6-di-tert-butyl-4-methylphenol, also thiazines such as phenothiazine or methylene blue, cerium(III) salts such as cerium(III) acetate and also nitroxides, in particular sterically hindered nitroxides, i.e. nitroxides of secondary amines which in each case bear 3 alkyl groups on the carbon atoms adjacent to the nitroxide group, with in each case 2 of these alkyl groups, in particular those which are not located on the same carbon atom, together with the nitrogen atom of the nitroxide group or the carbon atom to which they are bound forming a saturated 5- or 6-membered ring, as in, for example, 2,2,6,6-tetramethylpiperidin-1-oxyl (TEMPO) or 4-hydroxy-2,2,6,6-tetramethylpiperidin-1-oxyl (OH-TEMPO), mixtures of the abovementioned inhibitors, mixtures of the abovementioned inhibitors with oxygen, e.g. in the form of air, and mixtures of mixtures of the abovementioned inhibitors with oxygen, e.g. in the form of air. Preferred inhibitors are the abovementioned sterically hindered nitroxides, cerium(III) compounds and sterically hindered phenols and their mixtures with one another and also mixtures of such inhibitors with oxygen and mixtures of mixtures of these inhibitors with oxygen, e.g. in the form of air. Particular preference is given to inhibitor systems which comprise at least one sterically hindered nitroxide and a further component selected from among sterically hindered phenols and cerium(III) compounds and their mixtures with oxygen, e.g. in the form of air. The amount of inhibitor can be up to 2% by weight of the total amount of anhydride+alcohol. The inhibitors are advantageously used in amounts of from 10 ppm to 1000 ppm, based on the total amount of anhydride+alcohol. In the case of inhibitor mixtures, these figures relate to the total amount of the components with the exception of oxygen.

The reaction of the alcohol with the anhydride of a monoethylenically unsaturated $C_3$-$C_8$-monocarboxylic acid naturally leads primarily to a mixture of the ester with the monoethylenically unsaturated $C_3$-$C_8$-monocarboxylic acid used and possibly residues of excess anhydride and unreacted alcohol.

However, the excess anhydride generally makes up no more than 10% by weight, in particular no more than 5% by weight, of the amount of anhydride originally used. It has been found to be useful to destroy any anhydride present by reaction with water. The proportion of unreacted alcohol is preferably no more than 10% by weight and in particular no more than 5% by weight of the amount of alcohol used.

To separate the alcohol from the monoethylenically unsaturated $C_3$-$C_8$-monocarboxylic acid formed in the reaction, the latter can in principle be removed by distillation or in another way, e.g. by extraction of the acid. It is also possible to isolate the ester, e.g. by crystallization of the ester from an aqueous medium, with the acid and any anhydride present remaining in the mother liquor. However, isolation or separation of the ester is generally omitted. Rather, the mixture of ester with monoethylenically unsaturated $C_3$-$C_8$-monocarboxylic acid is, if appropriate with addition of further monomers M2 and, if appropriate, further ethylenically unsaturated monomers M3, M4 and/or M5, preferably subjected directly to a free-radical copolymerization.

In an analogous way, the monomers M1 or M3 prepared by esterification according to the method a) or by transesterification according to the method b) can also be used directly, i.e. without prior isolation or purification, in the subsequent polymerization of the monomers M.

If the polymerization of the monomers M is carried out as a solution polymerization in water, removal of the water is unnecessary for many applications. Otherwise, the polymer which can be obtained according to the invention can be isolated in a manner known per se, e.g. by spray drying of the polymerization mixture. If the polymerization is carried out in a solvent or solvent mixture which is volatile in steam, the solvent can be removed by passing steam into the mixture, resulting in an aqueous solution or dispersion of the comb polymer.

The comb polymers are preferably obtained in the form of an aqueous dispersion or solution. The solids content is preferably from 10 to 80% by weight, in particular from 30 to 65% by weight.

A further embodiment of the invention provides comb polymers which can be obtained by the process iii). Here, a homopolymer or copolymer having a carbon backbone and free carboxyl groups or ester-forming derivatives of carboxyl groups on the carbon backbone is reacted with alcohols of the formula HO-(Alk-O)$_n$—Y-Z or amines of the formula HNR-(Alk-O)$_n$—Y-Z in a polymer-analogous reaction. Processes for the polymer-analogous reaction of homopolymers or copolymers bearing free carboxyl groups or ester-forming derivatives of carboxyl groups are known from the prior art, for example from U.S. Pat. Nos. 5,840,114, 5,728,207, WO 98/31643 and WO 01/72853. The processes described there can be used in an analogous fashion for preparing the comb polymers of the invention.

As polymers having free carboxyl groups or ester-forming derivatives of free carboxyl groups, in particular anhydride groups, it is possible to use, for example, homopolymers and copolymers of monoethylenically unsaturated $C_3$-$C_8$-monocarboxylic acids and/or $C_4$-$C_8$-dicarboxylic acids or anhydrides thereof, for example homopolymers and copolymers of acrylic acid, methacrylic acid, maleic acid, maleic anhydride. These polymers can comprise further monomers M2, e.g. monomers bearing sulfonic acid groups, e.g. vinylsulfonic acid, acrylamidomethylpropanesulfonic acid, methallylsulfonic acid or alkali metal or ammonium salts thereof, and/or monomers M4 and/or M5, for example vinylaromatic monomers or olefins, in copolymerized form.

Suitable carboxyl-comprising polymers are, in particular, copolymers comprising from 5 to 100% by weight, in particular from 50 to 100% by weight, of at least one monoethylenically unsaturated $C_3$-$C_8$-monocarboxylic acid and/or $C_4$-$C_8$-dicarboxylic acid or anhydrides thereof, in particular acrylic acid, methacrylic acid, maleic acid or maleic anhydride, or mixtures thereof;

from 0 to 95% by weight, in particular from 0 to 50% by weight, of monoethylenically unsaturated sulfonic acids such as vinylsulfonic acid, acrylamidomethylpropanesulfonic acid, methallylsulfonic acid and/or alkali metal or ammonium salts thereof;

and from 0 to 95% by weight, in particular from 0 to 50% by weight, of one or more esters of monoethylenically unsaturated $C_3$-$C_8$-monocarboxylic acids or $C_4$-$C_8$-dicarboxylic acids, e.g. esters of acrylic acid, methacrylic acid or maleic esters of monohydric alcohols having from 1 to 8 carbon atoms in the molecule.

Particularly preferred carboxyl-comprising polymers are homopolymers of acrylic acid and methacrylic acid, copolymers of acrylic acid and methacrylic acid, copolymers of methacrylic acid and vinylsulfonic acid, copolymers of acrylic acid and maleic acid, copolymers of methacrylic acid and maleic acid, copolymers of acrylic acid and an ester of a monoethylenically unsaturated carboxylic acid, copolymers of methacrylic acid and an ester of a monoethylenically unsaturated carboxylic acid and also the alkali metal or ammonium salts of the copolymers mentioned.

In particular, preference is given to carboxyl-comprising polymers which are obtainable by free-radical polymerization of the abovementioned monomers in the presence of one of the abovementioned molecular weight regulators, in particular ones which are obtainable by free-radical polymerization in aqueous solution in the presence of at least 4% by weight, based on the monomers used in the polymerization, of a water-soluble sulfur compound in which the sulfur has the oxidation number+4. Such water-soluble sulfur compounds are, for example, sulfur dioxide, sulfurous acid, alkali metal, alkaline earth metal and ammonium salts of sulfurous acid or disulfurous acid, sodium, potassium, calcium or ammonium formaldehydesulfoxylate, dialkyl sulfites or mixtures thereof. Among these compounds, particular preference is given to potassium, ammonium or calcium sulfite, sodium, potassium, calcium or ammonium disulfite, sodium, potassium, calcium or ammonium hydrogensulfite or mixtures thereof. To provide further details in respect of the polymerization, WO 01/72853 is incorporated by reference.

The molar mass (number average) of these polymers is typically in the range from 500 to 100 000, preferably in the range from 1000 to 50 000. Particular preference is given to homopolymers of acrylic acid or methacrylic acid or copolymers of methacrylic acid and acrylic acid.

Specific examples of polymers comprising acid groups (the percentages are % by weight) are:
polyacrylic acid having a molecular weight of 2000,
polyacrylic acid having a molecular weight of 4000,
polyacrylic acid having a molecular weight of 8000,
polyacrylic acid having a molecular weight of 20 000,
copolymer of 70% of acrylic acid and 30% of maleic acid having a molecular weight of 70 000,
copolymer of 50% of acrylic acid and 50% of maleic acid having a molecular weight of 5000,
copolymer of 70% of methacrylic acid and 30% of maleic acid having a molecular weight of 5000,
copolymer of 70% of acrylic acid and 30% of methacrylic acid having a molecular weight of 10 000,
copolymer of 90% of acrylic acid and 10% of vinylsulfonic acid having a molecular weight of 10 000,
copolymer of 50% of acrylic acid and 50% of methacrylic acid having a molecular weight of 6000,
copolymer of 20% of acrylic acid and 80% of methacrylic acid having a molecular weight of 5000,
copolymer of 80% of acrylic acid and 20% of methacrylic acid having a molecular weight of 4000,
terpolymer of 40% of acrylic acid, 40% of methacrylic acid and 20% of maleic acid having a molecular weight of 5000.

The molecular weights indicated here are in each case the number average molecular weight.

The reaction of the carboxyl-comprising polymers with the alcohols or amines can be carried out in the presence or absence of catalysts. Catalysts used are, for example, strong oxo acids such as sulfuric acid, p-toluenesulfonic acid, benzenesulfonic acid, methanesulfonic acid, phosphoric acid, phosphorous acid or hydrohalic acids such as hydrochloric acid. If an acid acting as catalyst is used in the reaction, the amounts are up to 10% by weight, preferably up to 5% by weight, based on the total amount of carboxyl-comprising polymers and alcohols or amines.

The weight ratio in which the carboxyl-comprising polymer and the alcohols or amine are reacted can be in the range from 99:1 to 1:99 and is preferably in the range from 1:1 to 5:95 and particularly preferably in the range from 3:7 to 1:9.

The reaction is, for example, carried out by admixing the aqueous solutions of the polymer with an acid acting as catalyst if appropriate and the alcohol or amine and distilling off the water. The distillation of the water from the mixture is usually carried out under atmospheric pressure, but can also be carried out under reduced pressure. It is often advantageous to pass a gas stream through the reaction mixture during the distillation in order to remove the water and other volatile components more quickly. As gas stream, it is possible to use air, nitrogen or steam. However, it is also possible to remove the water under reduced pressure and additionally pass a gas stream through the reaction mixture. To distil off the water from the reaction mixture, energy has to be supplied to the mixture. Suitable apparatuses for this purpose are heatable stirred vessels, stirred vessels having external heat exchangers, stirred vessels having internal heat exchangers, thin film evaporators, kneaders and extruders. The water which vaporizes is taken off from the reaction medium via a vapor line and is condensed in a heat exchanger. It comprises only small amounts of organic constituents and can be disposed of via a water treatment plant.

Subsequent to or simultaneously with the removal of water from the reaction mixture, a condensation reaction between the polymer and the alcohol or amine occurs. The water formed as a result is likewise removed from the reaction medium. The reaction is carried out at, for example, temperatures in the range from 100 to 250° C. The temperature depends on the reaction apparatus and the residence time. If, for example, the condensation is carried out in a continuously operated extruder or thin film evaporator in which the residence time is only a few seconds or minutes, temperatures of from 150° C. to 250° C. can advantageously be employed. In stirred vessels or kneaders which are operated batchwise, a time of, for example, from 1 to 15 hours is required and the condensation is usually carried out in the temperature range from 100 to 200° C.

In one process variant, the carboxyl-comprising polymers can firstly be dewatered and the powder or granular material obtained can be condensed with the alcohol and/or amine.

After the condensation, the reaction mixture is cooled and if appropriate dissolved in water. Aqueous solutions of the reaction mixture can, for example, be prepared by adding water to the reaction mixture which is still at from 50 to 150° C. while stirring or by stirring the reaction mixture which is liquid at temperatures of from 50 to 150° C. into water. It is usual to use such an amount of water that a 20-95% strength by weight, preferably 30-50% strength by weight, aqueous solution of the comb polymer is obtained. At the same time as or subsequent to the dissolution of the condensation product, neutralization of the remaining acid groups can be carried out if appropriate. Neutralizing agents used are alkali metal, alkaline earth metal oxides or hydroxides in solid form or in the form of 10 to 50% strength by weight aqueous solutions or slurries in water. Examples of suitable bases are lithium hydroxide, sodium hydroxide, calcium hydroxide, calcium oxide, calcium hydroxide, magnesium oxide, magnesium hydroxide, aluminum oxide and aluminum hydroxide. Depending on the degree of neutralization, the aqueous solutions of the comb polymers can have a pH in the range from 1 to 12.

The reaction mixture can also remain undiluted after the condensation. On cooling, it generally solidifies to form a wax-like mass which can easily be melted again. This provides variations for transport. The reaction mixture can, for example, be packed in drums from which the condensation product can be melted again. It can also be transported and stored in the molten state. However, it is also possible to produce and handle aqueous solutions.

The water-free melt can also be mixed with inert powders to obtain free-flowing compounds. Inert powders which can be used are, for example, kieselguhr, silica gel, amorphous silica and/or amorphous silicon dioxide.

The comb polymers of the invention are particularly useful as additives for preparations of mineral binders, in particular for the additization of cement-comprising preparations such as concrete or mortar and display, in particular, superior properties in terms of their fluidizing action.

For the purposes of the present invention, cement is, for example, portland cement, alumina cement or mixed cement, for example pozzolanic cement, slag cement or other types. The comb polymers of the invention are particularly suitable for cement mixtures which comprise, as cement constituents, predominantly and in particular at least 80% by weight, based on the cement constituent, of portland cement. The comb polymers of the invention are for this purpose generally used in an amount of from 0.01 to 10% by weight, preferably from 0.05 to 3% by weight, based on the total weight of the cement in the cement preparation.

The comb polymers of the invention are also particularly suitable for the additization of gypsum and gypsum-comprising preparations. The comb polymers of the invention are for this purpose generally used in an amount of from 0.01 to 10% by weight, preferably from 0.05 to 3% by weight, based on the total weight of gypsum in the gypsum preparation.

The comb polymers can be added in solid form or as an aqueous solution to the ready-to-use preparation of the mineral binder. It is also possible to formulate comb polymers in solid form with the mineral binder and prepare the ready-to-use cement-comprising preparations from this mixture. The comb polymer is preferably used in liquid form, i.e. dissolved, emulsified or suspended form, for example in the form of the polymer solution, in the preparation of the preparation, i.e. in mixing with water.

The comb polymers of the invention can also be used in combination with the known concrete leveling agents and/or concrete fluidizers based on naphthalene-formaldehyde condensate sulfonate, melamine-formaldehyde condensate sulfonate, phenolsulfonic acid-formaldehyde condensate, lignosulfonates and gluconates. Furthermore, they can be used together with celluloses, e.g. alkylcelluloses or hydroxyalkylcelluloses, starches or starch derivatives. They can also be used in combination with high molecular weight polyethylene oxides (weight average molecular weight $M_w$ in the range from 100 000 to 8 000 000 daltons).

Furthermore, customary additives such as air pore formers, expansion agents, hydrophobicizing agents, setting retarders, setting accelerators, frost protection agents, sealants, pigments, corrosion inhibitors, leveling agents, grouting aids, stabilizers or hollow microspheres. Such additives are described, for example in EN 934.

The comb polymers of the invention can in principle also be used together with film-forming polymers. These are, for the purposes of the present invention, polymers whose glass transition temperature is $\leq 65°$ C., preferably $\leq 50°$ C., particularly preferably $\leq 25°$ C. and very particularly preferably $\leq 0°$ C. A person skilled in the art will be able to choose suitable polymers with the aid of the relationship between glass transition temperature of homopolymers and the glass transition temperature of copolymers established by Fox (T. G. Fox, Bull. Am. Phys. Soc. (Ser. II) 1, 1956, 123). Examples of suitable polymers which are commercially available for this purpose are styrene-butadiene polymers and styrene-acrylates (cf., for example, B. H. Lutz in D. Distler (editor), "Wässrige Polymerdispersionen" Wiley-VCH, Weinheim 1999, Chapters 10.3 and 10.4, pp. 230-252).

Furthermore, it is often advantageous to use the comb polymers of the invention together with antifoams. This prevents too much air being introduced in the form of air pores into the concrete when the ready-to-use mineral building materials are being prepared; such air pores would reduce the strength of the set of the mineral building material. Suitable antifoams comprise, in particular, antifoams based on polyalkylene oxides, trialkyl phosphates, such as tributyl phosphate and silicone-based antifoams. The ethoxylation products and propoxylation products of alcohols having from 10 to 20 carbon atoms are likewise suitable. The diesters of alkylene glycols or polyalkylene glycols and further customary antifoams are likewise suitable. Antifoams are usually used in amounts of from 0.05% by weight to 10% by weight, preferably from 0.5 to 5% by weight, based on the comb polymers.

The antifoams can be combined with the polymer in various ways. If the polymer is, for example, present in the form of an aqueous solution, the antifoam can be added in solid or dissolved form to the solution of the comb polymer. If the antifoam is not soluble in the aqueous polymer solution, emulsifiers or protective colloids can be added to stabilize it.

If the comb polymer is in the form of a solid as is obtained, for example, from spray drying or fluidized-bed spray granulation, then the antifoam can be mixed in as a solid or be processed together with the polymer in the spray drying process or spray granulation process.

The following examples illustrate the invention.

Analysis:

a) Determination of the K value:

The K values of the aqueous sodium salt solutions of the copolymers were determined by the method of H. Fikentscher, Cellulose-Chemie, volume 13, 58-64 and 71-74 (1932), in aqueous solution at a pH of 7, a temperature of 25° C. and a polymer concentration of the sodium salt of the copolymer of 1% by weight.

b) Determination of the Solids Content:

The determination is carried out by means of the analytical instrument MA30 from Sartorius. For this purpose, a defined amount of the sample (about 0.5 to 1 g) is weighed into an aluminum dish and dried to constant weight at 90° C. The percentage solids content (SC) is calculated as follows: SC=final weight of sample×100/initial weight of sample [% by weight].

c) Molecular Weight Determination:

The determination of the number average and weight average molecular weight was carried out by gel permeation chromatography (=GPC) using aqueous eluents.

The GPC analysis was carried out using an instrument combination from Agilent (Series 1100). This comprises:

| | |
|---|---|
| Gas introduction unit | Model G 1322 A |
| Isocratic pump | Model G 1310 A |
| Autosampler | Model G 1313 A |
| Column oven | Model G 1316 A |
| Control module | Model G 1323 B |
| Differential refractometer | Model G 1362 A |

In the case of polymers dissolved in water, a 0.08 mol/l TRIS buffer (pH=7.0) in distilled water+0.15 mol/L of chloride ions from NaCl and HCl serves as eluent.

The separation took place in a separation column combination. The columns No. 787 and 788 (each 8×30 mm) from PSS with GRAL BIO linear separation material are used. The flow rate was 0.8 ml/min at a column temperature of 23° C.

Calibration is carried out using polyethylene oxide standards having molecular weights of M=194-1 700 000 [mol/g] from PPS.

d) Preparation of alcohols of the formula HO-(Alk-O)$_n$—Y-Z

PREPARATIVE EXAMPLE 1 alcohol HO—(CH$_2$CH$_2$O)$_{20}$—CH$_2$CH$_2$— (morpholin-4-yl)

98.3 g of N-(2-hydroxyethyl)morpholine and 0.87 g of potassium hydroxide were placed in a 1 l pressure vessel provided with 2 propeller stirrers (diameter: 30/50 mm). The vessel was evacuated to 9 mbar and the mixture was dewatered at an internal temperature of 80° C. for 1 hour. Nitrogen was then admitted, the vessel was made inert to 0.5 bar and 660.8 g of ethylene oxide were metered in at an internal temperature of 120° C. over a period of 5.7 hours while stirring. The mixture was stirred at 120° C. for another 1 h and cooled to room temperature and depressurized. It was then heated to 10° C. under atmospheric pressure, the vessel was evacuated to 100 mbar and the mixture was stripped by means of nitrogen at 100 mbar for 30 minutes. Nitrogen was subsequently admitted again, the mixture was cooled to <80° C. and neutralized with 0.81 g of acetic acid. This gave a total of 760 g of the alcohol having an OH number of 61.8.

PREPARATIVE EXAMPLE 2

Alcohol HO—(CH$_2$CH$_2$O)$_{112}$—CH$_2$CH$_2$— (morpholin-4-yl)

The procedure of Preparative Example 1 was repeated, but only 19.7 g of N-(2-hydroxyethyl)morpholine were initially charged and a total of 740.0 g of ethylene oxide were metered in over 6.6 hours. This gave 755 g of the alcohol having an OH number of 11.4.

PREPARATIVE EXAMPLE 3 alcohol HO—(CH$_2$CH$_2$O)$_{20}$—CH$_2$CH$_2$— (pyrrolidin-2-on-1-yl)

The procedure of Preparative Example 1 was repeated, but 105.9 g of N-(2-hydroxyethyl)pyrrolidin-2-one were initially charged and a total of 660.8 g of ethylene oxide were metered in over 5.7 hours. This gave 766 g of the alcohol having an OH number of 60.1.

e) Preparation of monomers M1:

COMPARATIVE EXAMPLE 1

Preparation of the methacrylic ester of methylpolyethylene glycol (M=3000 g/mol)

601.2 g of methylpolyethylene glycol (M=3000 g/mol), 190 mg of 2,6-di-tert-butyl-4-methylphenol, 19.0 mg of 4-hydroxy-N,N-2,2,6,6-tetramethylpiperidin-1-oxyl and 3.3 g of sodium carbonate (anhydrous) were placed in a 1 l glass reactor provided with an anchor stirrer, thermometer, gas inlet, reflux condenser and dropping funnel. The mixture was heated to 80° C. while passing air into it. 38.5 g of methacrylic anhydride were then added and the mixture was allowed to react at 80° C. for 3 hours. Dilution with 346.4 g of water and cooling to room temperature gave about 970 g of an aqueous solution of the ester of methacrylic acid together with methacrylic acid in a molar ratio of 1:1 having a solids content of 65% and a pH of 6.9.

COMPARATIVE EXAMPLE 2

Preparation of the methacrylic ester of methylpolyethylene glycol (M=1000 g/mol)

350 g of methylpolyethylene glycol (M=1000 g/mol), 0.315 g of 2,6-di-tert-butyl-4-methylphenol, 31 mg of 4-hydroxy-N,N-2,2,6,6-tetramethylpiperidin-1-oxyl and 5.56 g of sodium carbonate (anhydrous) were placed in a 1 l glass reactor provided with an anchor stirrer, thermometer, gas inlet, reflux condenser and dropping funnel. The mixture was heated to 80° C. while passing air into it. 57.74 g of methacrylic anhydride was then added and the mixture was allowed to react at 80° C. for 3 hours. 225.4 g of water were then added and the mixture was allowed to cool to room temperature. This gave an aqueous solution of the ester of methacrylic acid together with methacrylic acid in the a molar ratio of 1:1 having a solids content of 65%.

EXAMPLE 1

Preparation of the Methacrylic Ester of the Alcohol from Preparative Example 1

The procedure of Comparative Example 1 was repeated, but 50.0 g of the alcohol from Preparative Example 1 were reacted with 69.9 g of methacrylic anhydride (90% strength) in the presence of 0.035 g of 4-hydroxy-N, N-2,2,6,6-tetramethylpiperidin-1-oxyl and 0.35 g of 2,6-di-tert-butyl-4-methylphenol and in the absence of sodium carbonate. Dilution with 118.0 g of water gave about 230 g of an aqueous solution of the ester in admixture with methacrylic acid in a molar ratio of 1:1 having a solids content of 65% and a pH of 6.8.

EXAMPLE 2

Preparation of the Methacrylic Ester of the Alcohol from Preparative Example 2

The procedure of Comparative Example 1 was repeated, but 625.7 g of the alcohol from Preparative Example 2 were reacted with 28.4 g of methacrylic anhydride (90% strength) in the presence of 0.014 g of 4-hydroxy-N,N-

2,2,6,6-tetramethylpiperidin-1-oxyl and 0.14 g of 2,6-di-tert-butyl-4-methylphenol and in the absence of sodium carbonate. Dilution with 352.3 g of water gave about 1 kg of an aqueous solution of the ester in admixture with methacrylic acid in a molar ratio of 1:1 having a solids content of 65% and a pH of 6.9.

EXAMPLE 3

Preparation of the Methacrylic Ester of the Alcohol from Preparative Example 3

200.0 g of the alcohol from Preparative Example 3, 79.3 g of methacrylic acid, 3.4 g of p-toluenesulfonic acid, 0.15 g of phenothiazine and 55.9 g of toluene were placed in a 1 l stirred vessel provided with a nitrogen inlet and water separator and the mixture was heated under nitrogen while stirring by means of a bath temperature of 140° C. The esterification was carried out under reflux for 7 hours while separating off the water of reaction formed. Cooling gave about 330 g of a toluene solution of the ester in admixture with excess methacrylic acid in a molar ratio of 1:3.3.

f) Preparation of the Comb Polymers According to the Invention

EXAMPLE 4

Preparation of Polymer 1 According to the Invention 298.7 g of water were placed in a 1 l glass reactor provided with an anchor stirrer, thermometer, nitrogen inlet, toluene separator and a plurality of feed vessels and the water was heated to 100° C. While passing in nitrogen and stirring under reflux, the feed streams 1 and 3 were then metered in continuously over a period of 5 hours and feed stream 2 was metered in continuously over 5.25 hours commencing at the same time and at a constant rate of addition. The toluene introduced with feed stream 1 was separated off continuously on the separator. To complete the copolymerization, the polymerization was allowed to continue for 1 hour after the feed streams had been added, the contents of the reactor were then cooled and neutralized with 25% strength by weight sodium hydroxide solution.

The solution obtained had a solids content of 34.1% by weight and a pH of 6.8. The K value of the polymer was 37.0.

Feed stream 1: 224.7 g of the ester from Example 3 (toluene solution).

Feed stream 2: 2.9 g of sodium peroxodisulfate dissolved in 39.1 g of water.

Feed stream 3: 17.0 g of 40% strength by weight aqueous sodium bisulfite solution.

EXAMPLE 5

Preparation of Polymer 2 According to the Invention

The polymerization was carried out as in Example 4, but 241.9 g of water were initially charged and the feed streams 1 and 2 had the following compositions.

Feed stream 1: 366 g of the reaction mixture from Example 2 (65% strength by weight), 5.8 g of methacrylic acid and 0.4 g of mercaptoethanol.

Feed stream 2: 21.0 g of a 7.5% strength by weight solution of sodium peroxodisulfate in water.

The pH and solids content of the polymerization mixture obtained and the K value of the polymer are shown in Table 1.

EXAMPLE 6

Preparation of Polymer 3 According to the Invention

The polymerization was carried out as in Example 4, but 224.6 g of water were initially charged and the feed streams 1 and 2 had the following compositions.

Feed stream 1: 341.5 g of the reaction mixture from Example 2 (65% strength by weight), 12.9 g of methacrylic acid and 1.0 g of mercaptoethanol.

Feed stream 2: 30.0 g of a 7.5% strength by weight solution of sodium peroxodisulfate in water.

The pH and solids content of the polymerization mixture obtained and the K value of the polymer are shown in Table 1.

EXAMPLE 7

Preparation of polymer 4 according to the invention

The polymerization was carried out as in Example 4, but 388.3 g of water were initially charged and the feed streams 1 and 2 had the following compositions.

Feed stream 1: 248.7 g of the reaction mixture from Example 2 (65% strength by weight), 69.8 g of the reaction mixture from Comparative Example 2 (65% strength by weight), 22.7 g of methacrylic acid and 1.7 g of mercaptoethanol.

Feed stream 2: 42.0 g of a 7.5% strength by weight solution of sodium peroxodisulfate in water.

The pH and solids content of the polymerization mixture obtained and the K value of the polymer are shown in Table 1.

EXAMPLE 8

Preparation of Polymer 5 According to the Invention

The polymerization was carried out as in Example 4, but 279.8 g of water were initially charged and the feed streams 1 and 2 had the following compositions.

Feed stream 1: 123.4 g of the reaction mixture from Example 2 (65% strength by weight), 89.1 g of the reaction mixture from Comparative Example 1 (65% strength by weight), 34.6 g of the reaction mixture from Comparative Example 2 (65% strength by weight), 22.7 g of methacrylic acid and 0.7 g of mercaptoethanol.

Feed stream 2: 25.7 g of a 7.5% strength by weight solution of sodium peroxodisulfate in water.

The pH and solids content of the polymerization mixture obtained and the K value of the polymer are shown in Table 1.

TABLE 1

| Polymer | pH | Solids content | K value (1% strength by weight in water) |
| --- | --- | --- | --- |
| 1 | 6.7 | 35.1% | 45.5 |
| 2 | 6.7 | 40.1% | 45.6 |
| 3 | 7.0 | 39.9% | 43.2 |
| 4 | 6.7 | 29.3% | 41.6 |
| 5 | 6.9 | 29.9% | 42.3 | g) Determination of the Fluidizing Action of the Comb Polymers 1 to 5 According to the Invention Apparatus:

Two 300 ml plastic beakers and a stirrer motor with propeller stirrer. For the evaluation, the truncated cone test specimen (internal diameter at the base: 3.5 cm/at the top: 2 cm, height: 6 cm), a glass plate and a 5 mm wide spatula.

Mix:

0.20 g of polymer (calculated on the basis of 100% by weight)

36.00 g of deionized water (including water in the respective polymer solution)

100.00 g of CEM 132.5 R cement (HeidelbergCement, Leimen Works)

Procedure:

Weigh the cement into one beaker and in the second beaker dilute the polymer with the amount of water indicated. Add the cement to the diluted polymer solution and stir at 500 rpm for 1 minute. Allow the modified cement paste to stand for 3 minutes, subsequently stir for 15 seconds and introduce into the truncated cone within 45 seconds. Deaerate laterally twice and vertically 5 times by means of the spatula, fill up again if necessary and smooth. Lift the mold quickly from the test specimen precisely 5 minutes after the commencement of mixing and allow the specimen to settle for 10 seconds. Measure the horizontal and vertical diameter of the cement paste cake and calculate the mean of the two measured values.

The following measured values were obtained:

| Polymer | Spread [cm] |
| --- | --- |
| 1 | 6.9 |
| 2 | 7.0 |
| 3 | 8.2 |
| 4 | 8.6 |
| 5 | 9.4 |

The results show that the polymers according to the invention display a good to very good fluidizing action in the cement paste.

The invention claimed is:

1. A comb polymer having a carbon backbone which bears polyether groups of the formula A

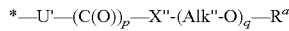

where
* indicates the point of bonding to the carbon backbone of the comb polymer,
U is a chemical bond or an alkylene group having from 1 to 8 carbon atoms,
X is oxygen or an NR group,
k is 0 or 1,
n is an integer whose average value, based on the comb polymer, is in the range from 11 to 300,
Alk is $C_2$-$C_4$-alkylene, with the Alk radicals within the group (Alk-O)$_n$ being able to be identical or different,
Y is a linear or branched alkylene group which has from 2 to 8 carbon atoms and may bear a phenyl ring,
Z is a 5- to 10-membered nitrogen heterocycle which is bound via nitrogen and can have, in addition to the nitrogen atom and carbon atoms, 1, 2 or 3 additional heteroatoms selected from among oxygen, nitrogen and sulfur as ring members, with the nitrogen ring members being able to bear a group R' and 1 or 2 carbon ring members being able to be present as carbonyl groups,
R is hydrogen, $C_1$-$C_4$-alkyl or benzyl and
R' is hydrogen, $C_1$-$C_4$-alkyl or benzyl;
and functional groups B are in the form of anionic groups at a pH of >12,
wherein on average at least 90 mol % of the Alk-O units in the group (Alk-O)$_n$ are $CH_2$—$CH_2$—O,
wherein the molar ratio of polyether groups A and functional groups B is in the range from 2:1 to 1:20,
or a salt of the comb polymer.

2. The comb polymer according to claim 1, wherein Z in the formula A is selected from among pyrrolidon-1-yl, morpholin-4-yl, piperazin-1-yl, piperidon-1-yl, morpholin-2-on-4-yl, morpholin-3-on-4-yl, piperazin-1-yl, 4-methylpiperazin-1-yl, imidazolin-2-on-1-yl, 3-methylimidazolin-2-on-1-yl and imidazol-1-yl.

3. The comb polymer according to claim 1, wherein on average at least every 4th carbon atom of the polymer backbone of the comb polymer bears a polyether group of formula A or a functional group B.

4. The comb polymer according to claim 1, wherein the groups B are carboxyl groups.

5. The comb polymer according to claim 1, which additionally has groups of the formula C:

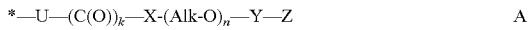

where
U' is a chemical bond or an alkylene group having from 1 to 8 carbon atoms,
X" is oxygen or an NR group, where R is hydrogen or $C_1$-$C_4$-alkyl,
p is 0 or 1,
Alk" is $C_2$-$C_4$-alkylene, with the Alk" radicals within the group (Alk"-O)$_q$ being able to be identical or different,
q is an integer whose average value, based on the comb polymer, is in the range from 2 to 300,
$R^a$ is selected from among hydrogen, $C_1$-$C_{10}$-alkyl, $C_1$-$C_{10}$-alkylcarbonyl, benzyl and benzoyl.

6. The comb polymer according to claim 1, which is obtainable by copolymerization of ethylenically unsaturated monomers M comprising
a) neutral monoethylenically unsaturated monomers M1 which bear one or two groups of the formula A and
b) monoethylenically unsaturated monomers M2 which bear one or two functional groups B,
or
by hompolymerization or copolymerization of ethylenically unsaturated monomers M comprising
a) monoethylenically unsaturated monomers M3 which bear a group of the formula A and a functional group B and, if appropriate
b) monoethylenically unsaturated monomers M2 which bear one or two functional groups B.

7. The comb polymer according to claim 6, wherein the monomers M1 are selected from among the esters of monoethylenically unsaturated $C_3$-$C_8$-monocarboxylic acids and diesters of monoethylenically unsaturated $C_4$-$C_8$-dicarboxylic acids with alcohols of the formula HO-(Alk-O)$_n$—Y—Z, where n, Alk, Y and Z are as defined above, and the amides of monoethylenically unsaturated $C_3$-$C_8$-monocarboxylic acids with amines of the formula NHR-(Alk-O)$_n$—Y—Z, where n, Alk, R, Y and Z are as defined above.

8. The comb polymer according to claim 7, wherein the monomers M3 are selected from among the monoesters of monoethylenically unsaturated $C_4$-$C_8$-dicarboxylic acids with alcohols of the formula HO-(Alk-O)$_n$—Y—Z, where n, Alk, Y and Z are as defined above.

9. The comb polymer according to claim 6, wherein the monomers M2 are selected from among monoethylenically unsaturated C$_3$-C$_8$-monocarboxylic acids and monoethylenically unsaturated C$_4$-C$_8$-dicarboxylic acids.

10. The comb polymer according to claim 6, wherein the copolymerization of the monomers M is carried out in the presence of a molecular weight regulator.

11. The comb polymer according to claim 1, which is obtainable by polymer-analogous reaction of homopolymers or copolymers having a carbon backbone which bear free carboxyl groups or ester-forming derivatives of carboxyl groups with alcohols of the formula HO-(Alk-O)$_n$—Y—Z or amines of the formula HNR-(Alk-O)$_n$—Y—Z, where n, Alk, R, Y and Z are as defined in claim 1.

12. An aqueous solution of the comb polymer according to claim 1, wherein the polymer is present in the form of an alkali metal salt.

13. The comb polymer according to claim 1, wherein n in formula A is from 20 to 200.

14. The comb polymer according to claim 1, wherein n in formula A is from 20 to 200.

15. The comb polymer to claim 1, wherein the groups B are carboxyl groups.

16. The comb polymer according to claim 1, wherein n in formula A is from 20 to 200 and the groups B are carboxyl groups.

17. The comb polymer according to claim 1, which is obtained by copolymerization of ethylenically unsaturated monomers M comprising,
   a) neutral monoethylenically unsaturated monomer M1 which is selected from the group consisting of an ester of monoethylenically unsaturated C$_3$-C$_8$-monocarboxylic acids and a diester of monoethylenically unsaturated C$_4$-C$_8$-dicarboxylic acids with an alcohol of the formula HO-(Alk-O)$_n$—Y—Z, an amide of a monoethylenically unsaturated C$_3$-C$_8$-monocarboxylic acid with an amine of the formula NHR-(Alk-O)$_n$—Y—Z, a vinyl ether of an alcohol of the formula HO-(Alk-O)$_n$—Y—Z, an allyl ether of an alcohol of the formula HO-(Alk-O)$_n$—Y—Z, and a methallyl ether of an alcohol of the formula HO-(Alk-O)$_n$—Y—Z, wherein n is an integer whose average value, based on the comb polymer, is in the range from 11 to 300,
   Alk is C$_2$-C$_4$-alkylene, with the Alk radicals within the group (Alk-O)$_n$ being able to be identical or different,
   Y is a linear or branched alkylene group which has from 2 to 8 carbon atoms and may bear a phenyl ring,
   Z is a 5- to 10-membered nitrogen heterocycle which is bound via nitrogen and can have, in addition to the nitrogen atom and carbon atoms, 1, 2 or 3 additional heteroatoms selected from among oxygen, nitrogen and sulfur as ring members, with the nitrogen ring members being able to bear a group R' and 1 or 2 carbon ring members being able to be present as carbonyl groups, and
   R is hydrogen, C$_1$-C$_4$-alkyl or benzyl and
   b) monoethylenically unsaturated monomer M2 which is selected from the group consisting of a monoethylenically unsaturated monocarboxylic acid having from 3 to 8 carbon atoms.

18. The comb polymer according to claim 1, which is obtained by copolymerization of ethylenically unsaturated monomer M comprising,
   a) neutral monoethylenically unsaturated monomer M1 which is an ester of monoethylenically unsaturated C$_3$-C$_8$-monocarboxylic acid, wherein
   n is an integer whose average value, based on the comb polymer, is in the range from 11 to 300,
   Alk is C$_2$-C$_4$-alkylene, with the Alk radicals within the group (Alk-O)$_n$ being able to be identical or different,
   Y is a linear or branched alkylene group which has from 2 to 8 carbon atoms and may bear a phenyl ring,
   Z is a 5- to 10-membered nitrogen heterocycle which is bound via nitrogen and can have, in addition to the nitrogen atom and carbon atoms, 1, 2 or 3 additional heteroatoms selected from among oxygen, nitrogen and sulfur as ring members, with the nitrogen ring members being able to bear a group R' and 1 or 2 carbon ring members being able to be present as carbonyl groups, and
   b) monoethylenically unsaturated monomer M2 which is selected from the group consisting of acrylic acid and methacrylic acid.

\* \* \* \* \*